April 15, 1941.  F. J. FISON  2,238,105
CLOSURE FOR JARS OR SIMILAR CONTAINERS
Filed April 13, 1938   3 Sheets-Sheet 1
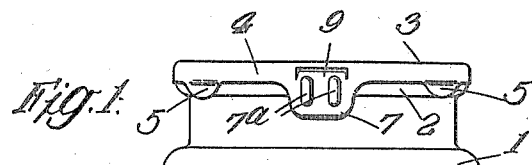
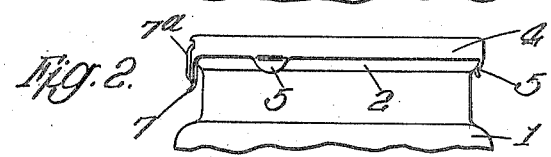
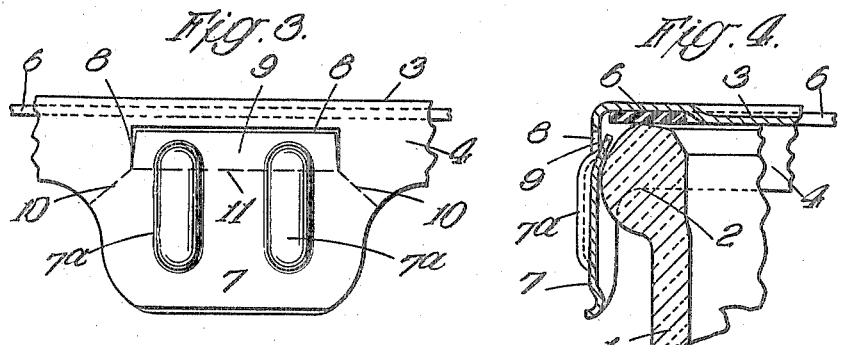
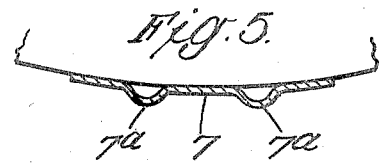
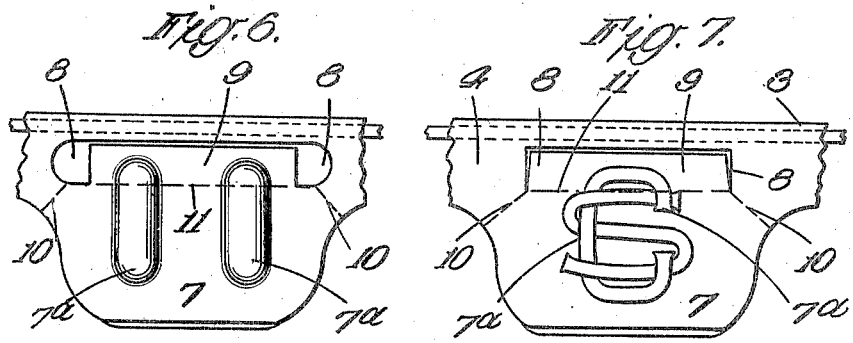
Frederick Jonathan Fison
Inventor
By Haseltine, Lake & Co.
Attorneys April 15, 1941.  F. J. FISON  2,238,105
CLOSURE FOR JARS OR SIMILAR CONTAINERS
Filed April 13, 1938  3 Sheets-Sheet 2
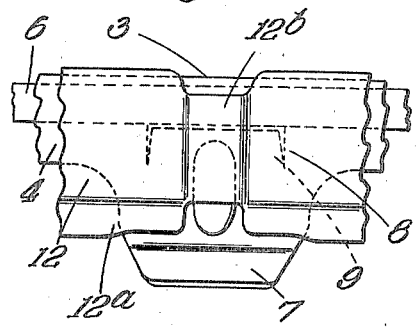
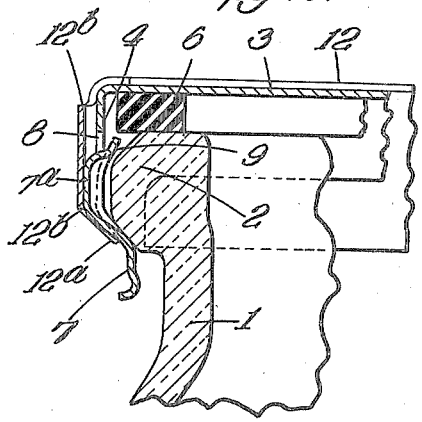
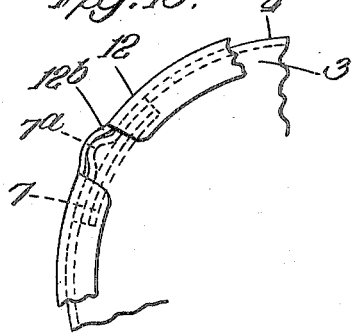
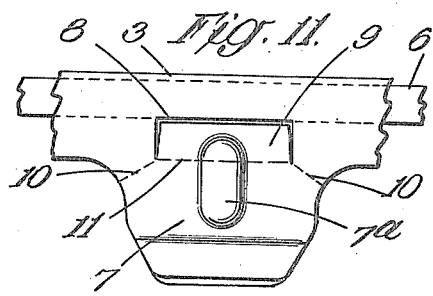
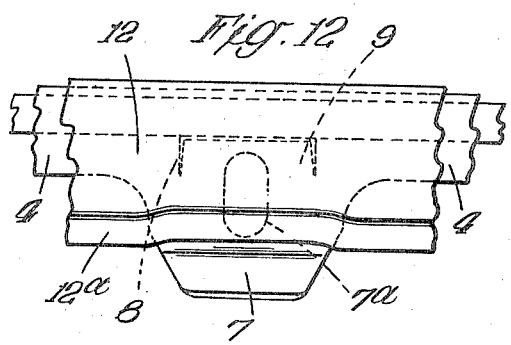
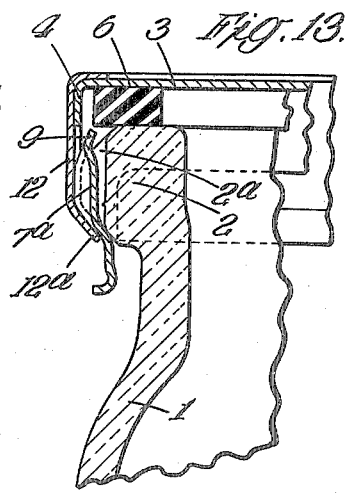
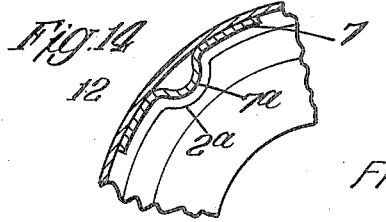
Frederick Jonathan Fison
Inventor
By Haseltine, Lake & Co.
Attorneys April 15, 1941.  F. J. FISON  2,238,105
CLOSURE FOR JARS OR SIMILAR CONTAINERS
Filed April 13, 1938  3 Sheets-Sheet 3
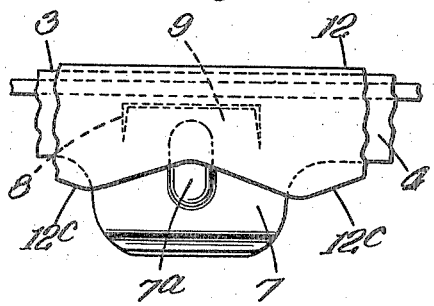
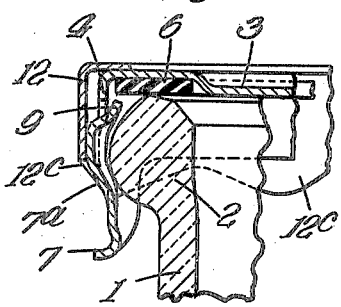
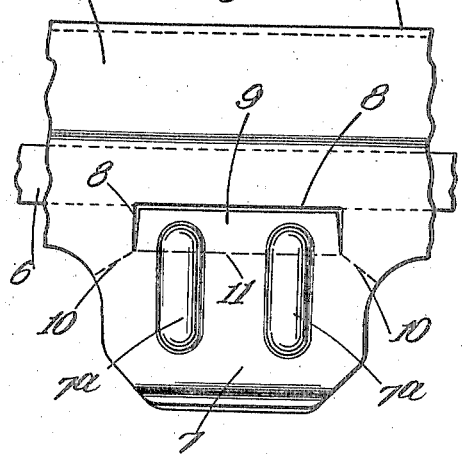
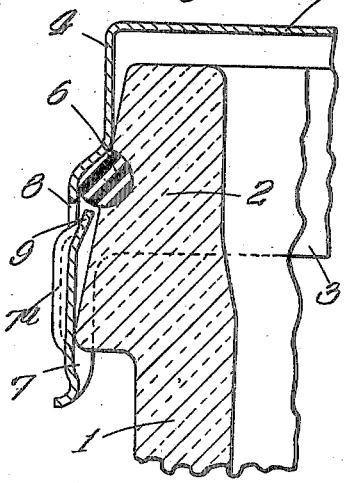
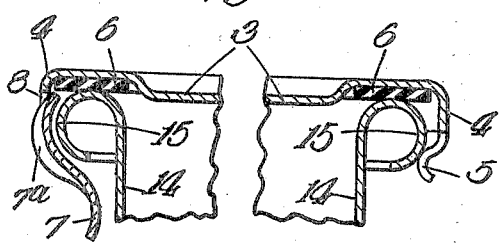
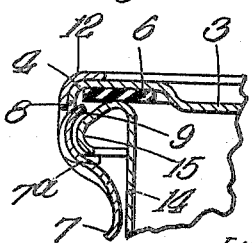
Inventor
Frederick Jonathan Fison
By Haseltine, Lake & Co.
Attorneys Patented Apr. 15, 1941

2,238,105

UNITED STATES PATENT OFFICE 2,238,105

CLOSURE FOR JARS OR SIMILAR CONTAINERS

Frederick Jonathan Fison, Histon, Cambridge, England, assignor to Chivers & Sons Limited, Cambridge, England, a British company Application April 13, 1938, Serial No. 201,794
In Great Britain March 26, 1938

8 Claims. (Cl. 215—46)

This invention relates to closures for jars or other containers such as are used for containing jam, preserved fruit, vegetables, "potted" meats or pastes, pickles or the like, and has more particular reference to closures for such jars or the like that comprise a metal or other cap, disc or member that is held against the mouth of the jar, usually by the effect of a vacuum within the jar with or without additional securing means such as retaining projections, bands or the like that engage with a bead or shoulder around the jar mouth.

The object of the invention is to provide an improved closure cap or cover which can be readily removed from the container without the use of any implement or tool.

According to the invention the cap or cover has an opening member or lever which is an integral part of the cap or cover and is capable of being angularly or similarly moved about a part of the cap or cover, the said member or lever having a strengthening portion preferably in the form of an embossing or corrugated section or area which reinforces the metal of the member or lever to enable it to partake of the angular movement without buckling so as to bear on part of the jar or container to lift the cap or cover by a levering action. The strengthened portion of the member preferably comprises an embossing or corrugation that extends towards and preferably beyond or across the fulcrum line, i. e. the line or axis about which the operating member or lever is angularly moved when operated to bear on the jar and thus lift or raise the cap. The embossing or corrugating provides an arch-shaped or similar section, the chord of which is preferably disposed at right angles to the plane of movement, and such section may extend across the whole or part of the member, but is preferably such as to provide one or two corrugations extending in the direction from top to bottom of the member.

In order that the invention may be clearly understood and readily carried into effect, the same will now be more fully described with reference to the accompanying drawings, in which:

Figures 1 and 2 are views taken at right angles of the upper part of a jar having a closing cap or cover provided with opening means comprising one embodiment of the improved opening member according to the invention.

Figures 3, 4 and 5 are respectively an enlarged front view, a sectional view and a sectional plan of the opening means shown in Figures 1 and 2.

Figures 6 and 7 illustrate modified constructions generally similar to that shown in Figures 3 and 4.

Figures 8, 9 and 10 are respectively a front view, a sectional view and a fragmentary plan view of a construction in which an exterior retaining band is used in conjunction with the cap or cover.

Figure 11 is a front view similar to Figure 8 showing the said band removed.

Figures 12, 13 and 14 illustrate an embodiment of the invention as applied to another form of closure or cap having an exterior retaining band, Figure 12 being a front view, Figure 13 a sectional view, and Figure 14 a fragmentary sectional plan.

Figures 15 and 16 illustrate a further modification in which an exterior retaining band is used.

Figures 17 and 18 are respectively a front view and a sectional view showing the invention applied to another form of jar closure.

Figures 19 and 20 are sectional views showing the invention applied to a metal can or container having a rolled edge that forms a bead around the mouth or opening of the can.

The jar or container which in most of the figures is made of glass or earthenware, is shown at 1, the jar having a bead or shoulder 2 around its mouth. The closing cap or cover 3 in the present example has three equi-spaced retaining projections or tabs 5 extending from the flange or skirt 4 and engaging the bead 2 to enable the cap to be used as a re-seal cover after the initial opening. The usual rubber gasket 6 may be used, but any form of rubber sealing may be employed. The opening member is constituted by the tab 7 extending beyond the skirt or flange 4 at a position in proximity to slits 8 in the flange 4 which forms the tongue portion 9, the latter and the extension 7 forming a lever which is capable of angular movement by raising its lower end so that the metal of the cap bends about the uncut parts at the lines 10 (see Figure 3) to enable the extension 7 and the tongue portion 9 to move together as a whole about the dotted line 11 as also shown in Figure 3, this line forming what may be referred to as the fulcrum line or axis. The tab or extension 7 as shown in Figures 3 and 4, is formed with outwardly disposed embossed portions or corrugations 7a punched or pressed into the metal so as to provide an arch-shaped section at each embossed portion which preferably extends upwardly beyond the fulcrum or axis 11, about which the tab 7 and the tongue 9 can be angularly moved as a whole by raising or pulling the tab 7 outwardly and upwardly to cause the tongue 9 to bear on the bead 2 and thus raise the cap 3 from the jar. By reason of the strengthening of the lever-like member by the embossed portions 7a it is ensured that the metal of the tab 7 and tongue 9 move together as a whole or unit about the fulcrum line or axis 11 without buckling so as to raise the lid from the jar, firstly to break the vacuum seal and then to remove the cap by the continued upward movement of the operating member or tab 7. It will be understood that the tab and tongue unit forming the lever may be arranged in various ways to suit the cap and the container, and the particular arrangement or form of the lever may influence the form and location of the bending lines. The cap or cover after being initially opened or removed can be used as a re-seal cover as the three retaining tabs 5 enable the cap to be retained on the jar or container by engaging the underside of the bead or shoulder. As it is not intended that the member 7 shall serve as a retaining member after the initial opening of the container, it is immaterial whether the said member or lever breaks away from the cap flange 4 as a result of the movement to effect the opening and removal of the cap or cover.

The example illustrated in Figure 6 is generally similar to that shown in Figures 3 and 4, but the cap is slotted at 8 in such manner as to leave the tongue 9 spaced from the ends of the slots. In this example, the operating member or lever formed by the tab 7 and the tongue 9 is strengthened to ensure the proper movement thereof, by embossed portions or corrugations 7a. Although the embossed portions are generally vertically disposed as shown in Figures 3 and 4, they may be inclined or otherwise arranged, and preferably made long enough to cross the fulcrum line or axis 11 about which the operating lever is moved when manipulated to open the closure.

In the example shown in Figure 7, the embossed portion is in the form of a monogram punched or pressed outwardly as indicated at 7a, the monogram as shown being preferably such as to provide vertical arch-shaped portions or sections which extend beyond the fulcrum line or axis 11.

In the example shown in Figures 8 to 11, the cap 3 has opening means similar to the opening means shown in Figures 1 to 5, but in this example instead of having retaining tabs 5 on the cap, a securing means in the form of an exterior band or ring 12 is fitted over and around the cap and secured in position by connecting its ends, the lower edge part 12a of the band being of serrated or other form and being adapted to be turned inwardly to engage under the jar bead or shoulder 2. The operating member or lever has a single embossed or corrugated portion 7a and the retaining band 12 is shaped with a portion at 12b pressed outwards to fit over the outwardly disposed embossed portion or corrugation 7a.

In the modification shown in Figures 12 and 13, the embossed portion or corrugation 7a on the operating lever is pressed inwardly instead of outwardly, and the jar bead or shoulder 2 may be recessed at 2a as shown in the fragmentary plan view, to receive the corrugated portion or embossing. Such a construction may be used without the retaining band, but when the latter is used as shown in Figures 12 and 13, it can fit closely around the cap without being specially shaped to accommodate the corrugated or embossed portion of the operating member.

In the construction shown in Figures 15 and 16 the corrugation or embossing on the operating lever is outwardly disposed as in Figures 8 and 9, but instead of shaping the exterior ring or band 12 to accommodate the embossing or corrugation, it is made of such diameter as to fit over the embossing or corrugation and away from the flange 4 of the cap 3, the lower edge of the band being formed with serrations or a series of projections 12c which are pressed under the bead 2 and are arranged in relation to the corrugations 7a as shown in Figure 15.

Figures 17 and 18 show another type of jar or container and a cap or cover therefor with an opening member having two strengthening corrugations 7a, a rubber sealing ring 6 being fitted as shown, and the tongue 9 of the operating member being adapted to co-operate with the jar surface just below the sealing ring.

Although the jars or containers above referred to are made of glass or earthenware, the closure can be applied to cans or metal containers, and examples of such applications are shown in Figures 19 and 20. Preferably the can 14 is formed with a rolled edge to form a bead 15 equivalent to the bead 2 which is formed on the glass or earthenware jar. The cap 3 is generally similar to that shown in Figure 1, and its opening lever is formed with the corrugations 7a and is shaped as shown to co-operate with the bead 15 to raise the cap as herein before described. Retaining tabs 5 may also be provided on the skirt or flange 4 of the cap 3 to co-operate with the bead 15 so as to enable the cap to be used as a re-seal cover. In the example shown in Figure 20, the bead 15 of the can or container 14 is of different shape from that shown in Figure 19, and as shown, an exterior retaining band 12 is used in conjunction with the cap. The band 12 may be formed with a slot or aperture to receive the corrugations 7a on the opening lever. In some instances the member or tab 7 could be usefully employed as a retaining means prior to the initial opening of the container, in which case its lower end would be shaped to engage with the underside of the bead. The lower part of the tab 7 may be formed in any suitable manner to render its manipulation by the thumb or fingers comfortable and convenient and the whole tab may be so formed that when pressed inwards against the container, its lower end will not be too near to the container so as to enable the thumb and fingers to engage the tab for pulling it outwards.

The invention is not limited to jars and containers as shown, but can be applied to various forms of containers in which it is required to lever off a cap or lid or to break a seal, and the opening lever may be in any position so that it can be moved about part of the cap to enable one end to bear on a part of the container to effect the levering action.

What I claim and desire to secure by Letters Patent of the United States is:

1. Closure means for jars and similar containers comprising a cap or cover having an upper part, means whereby it can be held on the jar and a depending portion cut or slit to form a tongue, the upper extremity of which can be caused to bear on an adjacent part of the jar for raising the cap and below which the depending portion is extended to form a tab which, together with the tongue, form a lever capable of angular movement about a fulcrum constituted by portions of the material adjacent the ends of the cut or slit, which lever has a formation extending above and below the fulcrum line or axis so as to ensure that the tab and tongue partake of angular movement as a whole about the said fulcrum axis, without deformation, to cause the extremity of the tongue to bear on the adjacent part of the jar to lift or open the cap as the tab portion is moved outwardly, without rupturing the material of the cap.

2. Closure means for jars or similar containers comprising a cap or cover having an upper part, means whereby it can be held on a jar and a depending portion slit circumferentially and downwardly at its ends to form a tongue between the ends of the slit, below which tongue the depending portion is extended to form a tab which, together with the tongue, has a means upon it to extend across an imaginary line taken through the portions of the material adjacent the ends of the slit so that the tongue and tab are reinforced to form a lever which as such can be angularly moved about the said fulcrum line to cause the tongue to bear on a part of the jar as the lever is angularly moved outwardly so as to raise or open the cap or cover.

3. Closure means for jars and similar containers as in claim 1, wherein the said combined tab and tongue has an embossed section which extends across the said fulcrum line or axis to render the tab and tongue movable as a whole without deformation to cause the tongue to bear with requisite pressure on the adjacent part of the jar to lift or raise the cap or cover when the tab is moved outwardly.

4. Closure means for jars and similar containers as in claim 1, wherein the said combined tab and tongue has a corrugated section which extends across the said fulcrum line to render the tab and tongue movable as a whole without deformation to cause the tongue to bear with requisite pressure on the adjacent part of the jar to lift or raise the cap or cover when the tab portion is moved outwardly.

5. Closure means for jars and similar containers as in claim 1 wherein said formation comprises a plurality of embossed portions extending in the direction from top to bottom of the lever forming thereon arch-shaped sections, the chords of which are substantially at right angles to the plane of movement of said lever.

6. Closure means for jars and similar containers as in claim 1 wherein said formation comprises a plurality of corrugated portions extending in the direction from top to bottom of the lever forming thereon arch-shaped sections, the chords of which are substantially at right angles to the plane of movement of said lever.

7. Closure means for jars and similar containers comprising a cap or cover having an upper part, a depending portion of said cap cut or slit to form a tongue, the upper extremity of which can be caused to bear on an adjacent part of the jar for raising the cap and below which the depending portion is extended to form a tab which, together with the tongue, form a lever capable of angular movement about a fulcrum constituted by portions of the material adjacent the ends of the cut or slit, which lever has a formation extending above and below the fulcrum line or axis so as to ensure that the tab and tongue partake of angular movement as a whole about the said fulcrum axis, without deformation, to cause the extremity of the tongue to bear on the adjacent part of the jar to lift or open the cap as the tab portion is moved outwardly, without rupturing the material of the cap and an exterior securing band fitted over and around said cap or cover, the lower edge of said band being turned inwardly to engage under an adjacent bead portion of said jar, a portion of said band being shaped to fit over said formation on said lever.

8. Closure means for jars and similar containers comprising a cap or cover having an upper part, means whereby it can be held on the jar, a sealing ring of resilient material such as rubber disposed between said cap and the upper part of said jar and a depending portion cut or slit to form a tongue, the upper extremity of which can be caused to bear on an adjacent part of the jar just below said sealing ring for raising the cap and below which the depending portion is extended to form a tab which, together with the tongue, form a lever capable of angular movement about a fulcrum constituted by portions of the material adjacent the ends of the cut or slit, which lever has a formation extending above and below the fulcrum line or axis so as to ensure that the tab and tongue partake of angular movement as a whole about the said fulcrum axis, without deformation, to cause the extremity of the tongue to bear on the adjacent part of the jar to lift or open the cap as the tab port on is moved outwardly, without rupturing the material of the cap.

FREDERICK JONATHAN FISON.